US008542882B2

(12) United States Patent
Wieneke

(10) Patent No.: US 8,542,882 B2
(45) Date of Patent: Sep. 24, 2013

(54) METHOD FOR DETERMINING FLOW CONDITIONS

(75) Inventor: Berhnard Wieneke, Goettingen (DE)

(73) Assignee: LA Vision GmBH, Gottingen (DE)

( * ) Notice: Subject to any disclaimer, the term of this patent is extended or adjusted under 35 U.S.C. 154(b) by 215 days.

(21) Appl. No.: 13/202,397

(22) PCT Filed: Jan. 11, 2010

(86) PCT No.: PCT/EP2010/000082
§ 371 (c)(1),
(2), (4) Date: Aug. 19, 2011

(87) PCT Pub. No.: WO2010/094370
PCT Pub. Date: Aug. 26, 2010

(65) Prior Publication Data
US 2011/0299738 A1    Dec. 8, 2011

(30) Foreign Application Priority Data

Feb. 19, 2009   (DE) .......................... 10 2009 009 551

(51) Int. Cl.
G06K 9/62    (2006.01)
(52) U.S. Cl.
USPC ........... 382/107; 382/133; 382/141; 382/154; 250/222.2; 356/442; 702/21
(58) Field of Classification Search
None
See application file for complete search history.

(56) References Cited

U.S. PATENT DOCUMENTS

| 5,905,568 A | * | 5/1999 | McDowell et al. ............. 356/28 |
| 6,603,535 B1 | | 8/2003 | McDowell |
| 7,382,900 B2 | | 6/2008 | Wieneke |
| 2008/0123939 A1 | | 5/2008 | Wieneke |

FOREIGN PATENT DOCUMENTS

| DE | 10 2006 055 746 A1 | 5/2008 |
| EP | 1 517 150 B1 | 3/2005 |

OTHER PUBLICATIONS

Toshio Hori et al., "High-speed scanning stereoscopic PIV for 3D vorticity measurement in liquids", Measuremenet Science and Technology, vol. 15, No. 6, 2004, 26 pages total.*
Jochen Willneff et al., A New Spatio-Temporal Matching Algorithm for 3D-Particle Tracking Velocimetry, The 9th of International Symposium on Transport Phenomena and Dynamics of Rotating Machinery, Honolulu, Hawaii, Feb. 10-14, 2002, pp. 1-7.*
International Search Report dated Apr. 8, 2010.

* cited by examiner

*Primary Examiner* — Brian P Werner
(74) *Attorney, Agent, or Firm* — Cheryl F. Cohen; Christa Hildebrand

(57) ABSTRACT

The invention relates to a method for determining flow conditions in a measured volume permeated by a fluid spiked with optically detectable particles. A plurality of two-dimensional images of the particle distribution is thereby created at each of a plurality of times, an estimated particle distribution is determined therefrom, and a three-dimensional displacement vector field is calculated. According to the invention, a transfer function for the image detectors used is first determined, by means of which the real distribution is mapped by the image detector. Starting from a roughly estimated initial distribution, and by means of the transfer function, virtual images of the estimated distribution are then calculated and compared to the associated real images. The estimated distribution is modified in an iterative method until sufficient matching of the virtual and real images has been achieved.

7 Claims, 2 Drawing Sheets

METHOD FOR DETERMINING FLOW CONDITIONS

Figure 1:
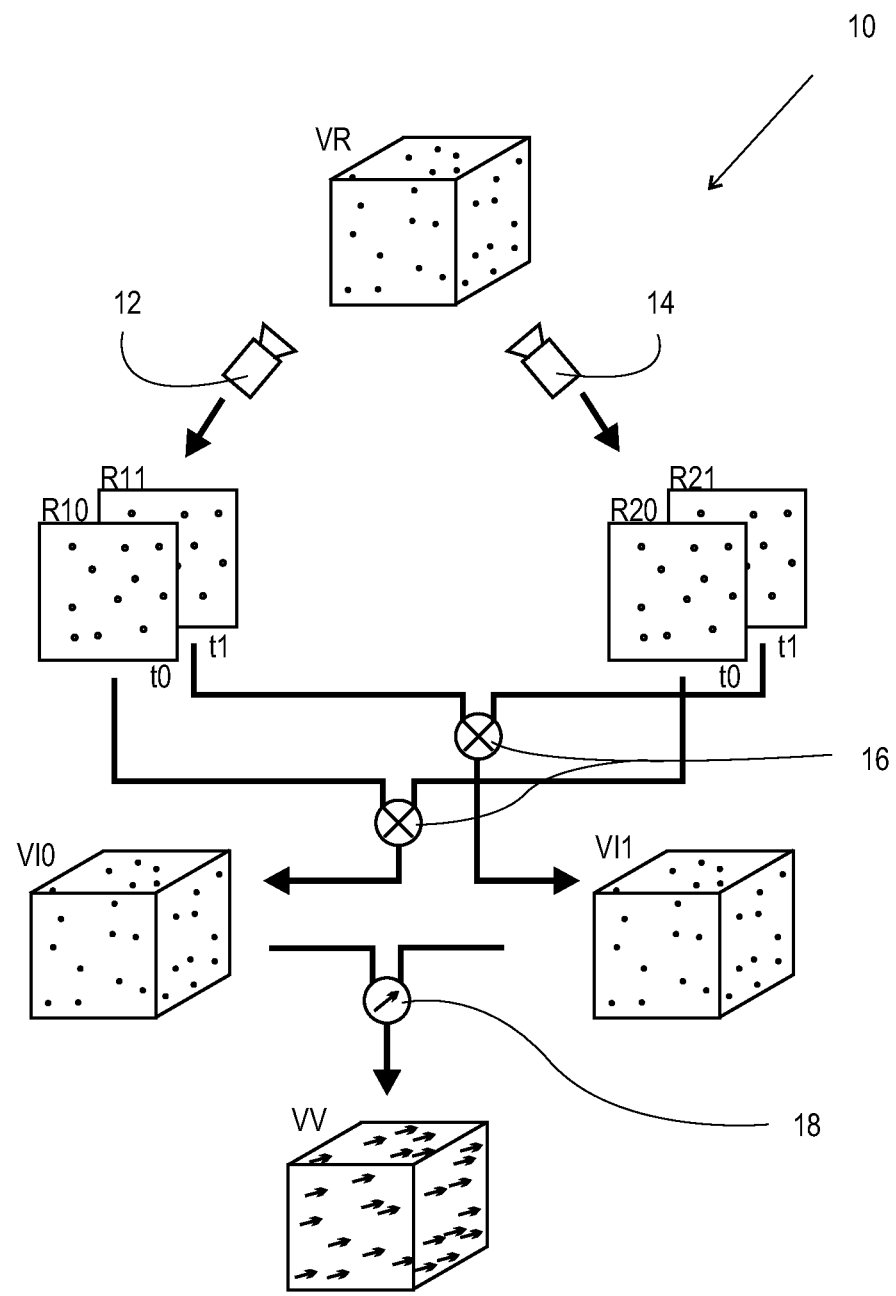

BACKGROUND OF THE INVENTION (1) Field of the Invention

The invention relates to a method for determining flow conditions in a measuring volume, which is flowed through by a fluid seeded with optically detectable particles, comprising the following steps:
a) Simultaneous recording at a first recording point in time of a first plurality of two-dimensional, real images of a three-dimensional, real distribution of the particles by means of the same plurality of image detectors arranged spatially offset with respect to one another,
b) Repetition of Step a, at least at one second recording point in time,
c) For each recording point in time: determination of a three-dimensional, estimated distribution of the particles based on the real images and
d) Calculation of a three-dimensional displacement vector field by comparing the estimated distributions.

(2) Description of Related Art

Methods of this type are known as 3D-PTV, Three-Dimensional Particle Tracking Velocimetry. Details on this are known, for example, from *Th. Dracos (ed.), Three Dimensional Velocity and Vorticity Measuring and Image Analysis Techniques,* 209-227 (1996) Kluver Academic Publishers. 3D-PTV is based on the basic concept of individually determining the individual positions of a plurality of particles in a measuring volume at different points in time by means of triangulation. By comparing the distributions determined at these different points in time, a displacement vector can be determined for each individual particle, which represents the movement of the particle between the two measuring points in time. Specifically, a measuring volume is simultaneously recorded by several cameras, typically by three or four cameras, at different observation angles. In each of the 2-dimensional images recorded, the 2-dimensional particle position is determined for each imaged particle. Subsequently, the 3-dimensional particle position in the measuring volume is determined from the review of the different images, with the knowledge of the respective observation angle for each imaged particle. This step is generally referred to as triangulation. This method is carried out at least two successive points in time, so that at least some of the particles in the measuring volume change their position slightly but in a clearly measurable manner between the recording points in time due to the flow in the measuring volume. In a step often referred to as tracking, the corresponding particle positions determined at the different points in time are assigned to one another. A comparison of the particle positions assigned to one another leads to the calculation of a displacement vector field, which contains a vector for each particle in the measuring volume or for each volume element of defined size, which vector represents the respective flow-induced displacement between the observation points in time. A disadvantage of this method lies in its limitation to comparatively small particle numbers and particle densities in the measuring volume. A particle density that is too large leads in the imaging of the three-dimensional measuring volume to multiple overlapping of the images of the particles in the camera images recorded, so that the determination of the 2-dimensional particle positions is inaccurate and faulty. In the triangulation, major errors thus occur in the determination of the 3-dimensional particle positions. For example, existing particles are not found or non-existent particles, so-called "ghost particles", are "found".

This can be remedied in part by the use of a larger number of detectors in different spatial positions, which view the measuring volume at different observation angles. However, this approach can be pursued only to a limited extent due to reasons of space and cost. Furthermore, with the growing number of detectors, i.e., with a growing number of images to be taken into consideration in the triangulation, the computing time and thus the measuring time are increased substantially. However, the speed resulting from its mathematical simplicity is precisely one of the particularly advantageous properties of 3D-PTV, which in general one wants to retain.

If the time aspect is not important, other known methods can be used, in particular PIV, Particle Imaging Velocimetry, with tomographic reconstruction, known as Tomo-PIV for short. In this method, which is known from EP 1 517 150 B1, likewise two-dimensional images of a three-dimensional measuring volume are recorded at different observation angles and in pairs at different points in time. The measuring volume in Tomo-PIV can be seeded with a much higher particle density compared to PTV. However, no individualized observation is carried out of individual particles, the position of which is determined by triangulation. Instead, tomographic reconstruction methods are used, which subdivide the measuring volume into a multiplicity of fixed voxels and calculate mere intensity distributions. A three-dimensional displacement vector field is then determined by cross correlation techniques, which are applied to the voxel-based, three-dimensional intensity distributions. The advantage of Tomo-PIV lies in the high density of the displacement vectors achievable in the resulting three-dimensional displacement vector field. However, the method is very computationally intensive and therefore time-consuming.

BRIEF SUMMARY OF THE INVENTION

The object of the present invention is to further develop a generic method such that, based on known 3D-PTV techniques, a greater particle density in the measuring volume can be processed and thus a greater density of displacement vectors in the resulting three-dimensional displacement vector field can be achieved.

This object is attained in conjunction with the features of the preamble of claim 1 by the step
e) For each image detector: determination of an optical transfer function with which the real distribution is imaged by the image detector,
being carried out before Step c,
as well as further by the fact that
step c starts with a roughly estimated initial distribution as an estimated distribution and thereafter is carried out iteratively with the following sub-steps:
c1) Calculation of two-dimensional, virtual images of the estimated distribution on the basis of the transfer functions determined in Step e,
c2) Comparative determination of differences between the virtual images and the respectively assigned real images,
c3) Changing the estimated distribution depending on the determined differences, wherein the iteration is ended when a predetermined termination criterion has been reached.

The basic concept of the present invention is to replace the unambiguous triangulation calculation of the particle distribution in the measuring volume, which restricts the known method, by an iterative reconstruction method. This means that an attempt is not even made, as with 3D-PTV, to exactly calculate the three-dimensional particle distribution from a plurality of ambiguous, two-dimensional particle positions. Instead, initially a rough estimate of the particle distribution in the measuring volume is made. A simple method for this is to select as a starting distribution the result of a rough triangulation, as was described above in connection with a 3D-PTV method according to the prior art. The number estimate can be made on the basis of the known parameters of the seeding process. Other methods for obtaining the rough estimate referred to here as the starting distribution are also conceivable. The specific manner of obtaining the starting distribution is not of essential importance for the present invention.

Based on the starting distribution, two-dimensional virtual images are now calculated, i.e., those images which would be recorded by the detectors if the starting distribution corresponded to the actual particle distribution in the measuring volume, which as a rule will not be the case. Accordingly, differences result between the virtual images and the real images, i.e. those images that were actually recorded by the detectors. Differences between the virtual images and the real images indicate errors in the estimated starting distribution, so that the parameters of the estimated starting distribution, such as, for example, number, position, size, brightness, etc., of one or more particles can be changed in order to improve the distribution estimate, i.e., to bring the estimated distribution close to the actual distribution. The estimated distribution changed in this manner is used as a basis for the next iteration step. That means that again virtual images are calculated, i.e., those two-dimensional images which would be recorded by the detectors if the changed estimated distribution corresponded to the actual distribution. Subsequently, a further comparison of the new virtual images with the real images is carried out, the deviations being reduced from iteration step to iteration step. The iteration is carried out until a predetermined termination criterion has been reached. This can be, for example, when the deviations are below predetermined tolerance limits. This means then that the estimated distribution corresponds to the actual distribution within predetermined tolerances. In this manner the actual distribution can be determined without triangulation calculation within the scope of a desired accuracy. Alternatively or additionally, a predetermined number of iteration steps can be used as a termination criterion. With the particle distributions thus determined at all measuring points in time, it is then possible to return to the known 3D-PTV method and to calculate the three-dimensional displacement vector field by tracking or by other methods.

In order to ensure that the changes made lead to the desired improvement in the estimate of the particle distribution, it can be provided in a further development of the method according to the invention that in Step c2, i.e., in the comparison of the virtual images with the real images, in addition differences between virtual images of different iteration steps can be determined. The underlying concept will be explained on the basis of the position correction of a concrete particle. For example, if the stepwise reduction of a given deviation correlates with a linear position displacement of a concrete particle and it is established that the last made displacement of the particle, contrary to the previous trend, leads to an enlargement of the observed deviation, this can be interpreted as an indication that the position correction by linear displacement of the particle has exceeded its maximum and therefore other corrections regarding this particle are needed, such as, for example, a change of its size, the direction of its position correction, or the like. In other words, to improve the convergence of the iteration it is proposed to take into consideration not only the deviations between current virtual images and assigned real images, but also trends which are discernible only by observing one or more previous iteration steps.

In an advantageous further development of the invention, it is provided that the step of repeating the recording of the measuring volume is carried out at more than one second recording point in time, and in the step of changing the estimated distribution, each change of the estimated distribution is subjected to a plausibility check under the assumption that no non-marginal particle can disappear from the measuring volume. Thus it may be, for example, that on the basis of the treatment according to the invention of images that were recorded at a first and a second point in time, the removal or addition of a particle is provided as a change of the estimated distribution, whereas on the basis of the treatment according to the invention of images which were recorded at the first and a third point in time, no such measure is provided. This then indicates that the measure is not necessary, but a shielding of a particle by other particles occurred at the second recording point in time. Based on a plausibility check of this type, the provided measure can then be omitted or modified. However, a plausibility check of this type is useful only with sufficient distance from the edge of the measuring volume, since particles diffusing in or diffusing out can actually occur in the edge region.

The determination of the optical transfer function has an important role to play. The optical transfer function in each case describes the imaging of the real particle distribution in the measuring volume on the two-dimensional detector surface of a concrete detector. Thus each detector has its own transfer function.

The optical transfer function comprises two aspects above all. A first aspect often referred to as "mapping", relates to the geometric assignment of a 3-dimensional position in the measuring volume to a 2-dimensional position in a recorded image. A second aspect relates to the imaging of an infinitesimal light spot as a "diffraction disk." This second aspect is often referred to as an optical modulation transfer function (MTF) and also covers, for example, distortions by spherical or spectral aberrations or astigmatism. Both aspects are jointly referred to here as an optical transfer function, wherein the weighting of the individual aspects within the resulting optical transfer function can be different for concrete embodiments of the invention.

The optical transfer function must be known in order to calculate the virtual images essential for the present invention from an assumed particle distribution in the measuring volume. The accuracy with which the optical transfer functions are known determines the accuracy of the method according to the invention. The optical transfer functions can be determined in a simple manner by calibration, in particular by recording real images of one or more known objects in the measuring volume and comparing the known object or objects to the recorded images. To this end, for example, a calibration plate with markings of known size and arrangement can be positioned at different positions in the measuring volume and respectively recorded. It can be accurately determined from the resulting images how different regions of the measuring volume are imaged. Alternatively to the calibration plate, a calibration grid can also be used, i.e., a three-dimensional distribution of markings of known size and arrangement. If the markings are sufficiently small on the calibration plate or calibration grid, "mapping" and MTF determination can be carried out at the same time. With larger markings, "mapping" and MTF determination are typically carried out in separate calibration steps.

In addition to calibration objects of this type, real particles of known size and known brightness can be used for the correction of the transfer functions. A corresponding correction method is known from DE 10 2006 055 746 A1. In this variant "mapping" and MTF determination are typically carried out at the same time.

Further features and advantages of the invention are shown by the following specific description and the drawings.

BRIEF DESCRIPTION OF THE SEVERAL VIEWS OF THE DRAWING(S)

They show:
FIG. 1: A diagrammatic representation of the 3D-PTV method,
FIG. 2: A diagrammatic representation of an individual step of the method according to the invention from FIG. 1.

DETAILED DESCRIPTION OF THE INVENTION

FIG. 1 shows a diagrammatic representation of the 3D-PTV method, the generality of which, as depicted, is known by one skilled in the art. The starting point is a real volume VR, which represents a measuring volume, which is flowed through by a fluid which is seeded with optically detectable particles. Preferably fluorescent or reflecting particles are used, which are preferably embodied identically or at least in a similar manner, and the density thereof is adapted in particular to the fluid density. For example, hollow or filled glass or plastic beads or—in particular in gas flows—droplets of liquid, can be used. However, in principle it is also possible to use irregular particles, such as, for example, carbon black particles.

The measuring volume VR is recorded by a plurality of image detectors 12, 14 to produce real images. In the embodiment shown, two detectors 12, 14 are illustrated. However, it is likewise possible to use more than two detectors. It is necessary for at least two of the detectors to record the measuring volume at different observation angles. Without restricting the generality, the following description is provided based on the embodiment with two detectors 12, 14, and it is easy for one skilled in the art to apply the teaching of the present disclosure to embodiments with more than two detectors.

Each detector 12, 14 records in each case at two different points in time t0 and t1 one two-dimensional real image of the real measuring volume VR. This results in at least four real images R10, R11, R20 and R21. The indexing is intended to indicate that the real image R10 was recorded by the first detector 12 at the point in time t0, the real image R11 was recorded by the first detector 12 at a point in time t1, the real image T20 was recorded by the second detector 14 at the point in time t0, and the real image R21 was recorded by the second detector 14 at the point in time t1.

For each point in time tj, where j=0 or 1, a link 16 of the respectively assigned pairs of images R10, R20 and R11, R21 is subsequently carried out. These links 16 lead to two virtual reconstructions of the measuring volume VR, which here are referred to as virtual or imaginary volumes VIj, wherein the virtual volume VI0 represents the measuring volume VR at the point in time t0, and the virtual volume VI1 represents the measuring volume VR at the point in time t1.

A three-dimensional displacement vector field VV is generated by the subsequent link 18, which is fundamentally known to one skilled in the art. The displacement vector field VV is produced by individual comparison of the positions of the particle images in the virtual volumes VIj. It thus represents the position changes of each individual particle in the measuring volume VR between the point in time t0 and the point in time t1.

The modification according to the invention of this fundamentally known method lies in the special embodiment of the link 16, with which the virtual volumes VIj are calculated from the real images R1j, R2j. The link 16 is shown diagrammatically in FIG. 2.

The starting point is a roughly assumed particle distribution in the measuring volume VR. In other words, a virtual volume VIstart is preset. The preset condition can be, for example, a theoretically calculated distribution of a number of estimated particles, wherein the numerical estimate can result from a particle density known from the test set-up. However, other estimate mechanisms can also be used which are based, for example, on the recorded real images R10, R11, R20, R21. In particular, the result of a 3D-PTV measurement carried out in advance (quickly and correspondingly less accurately) can also be used as a starting distribution. The concrete origin of the preset virtual starting volume VIstart is not important for the present invention. Based on the preset starting condition, an iteration process is started according to the invention. First VIstart is set as the current virtual volume VIj, wherein j indicates the represented point in time tj. From the current virtual volume VIj, virtual images I1j and I2j are calculated, which would correspond to the real images recorded by the detectors 12, 14 at the point in time tj if the particle distribution, as represented by the virtual volume VIj, corresponded to the actual distribution in the real volume VR. This calculation of the virtual images I1j, I2j is based on optical transfer functions F1, F2, which respectively represent the imaging of the volume VR on the detector surfaces of the first detector 12 and the second detector 14.

Figure 2:
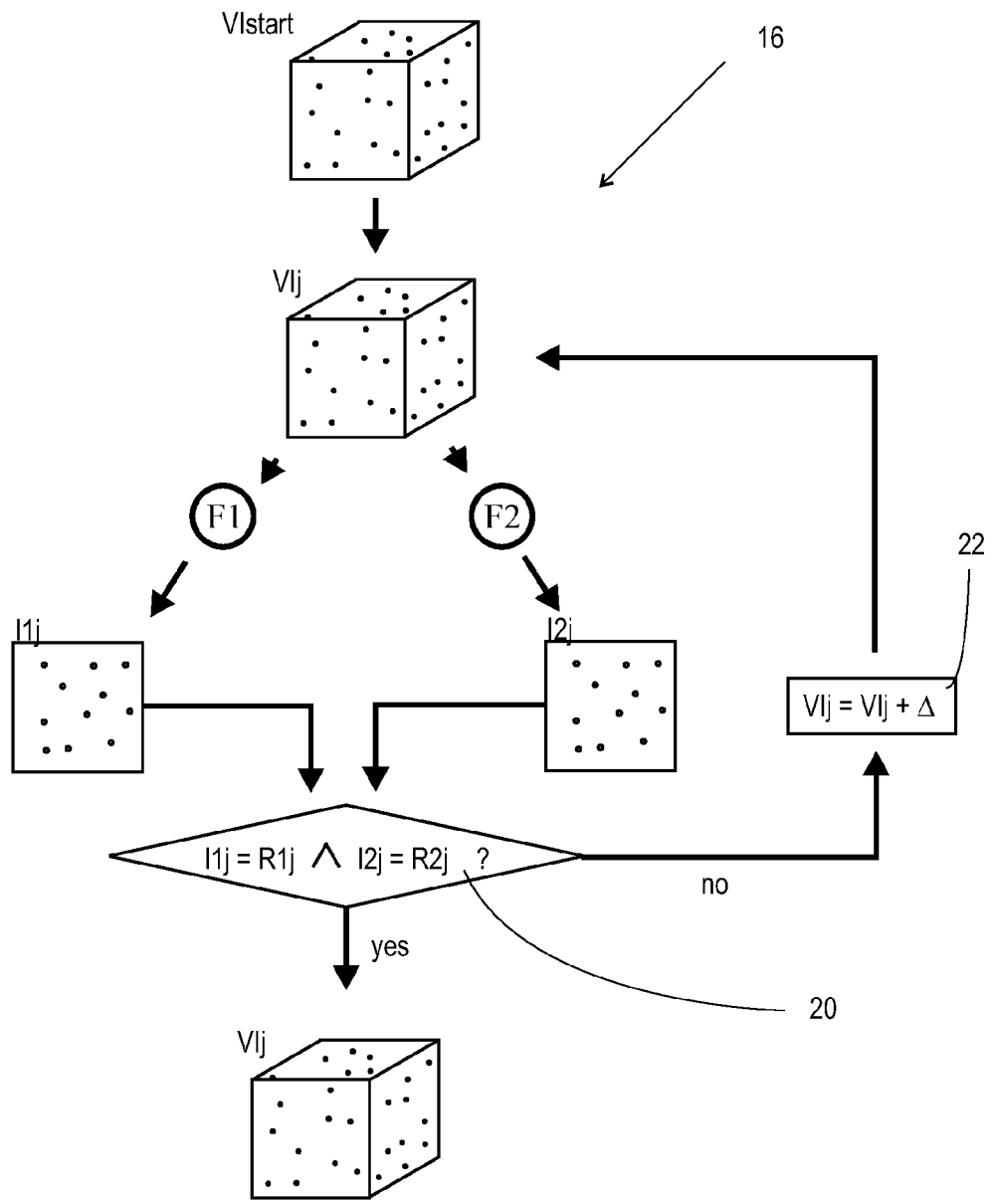

In the next Step 20, the virtual images I1j, I2j are compared to the real images R1j and R2j. As the indexing makes clear, in each case only one comparison of the real images recorded by a given detector has to be made with virtual images that were based on the optical transfer function of this specific detector, and the method is carried out separately for each point in time t0, t1. The comparison can lead to the result that each of the virtual images I1j, I2j coincides with the respectively assigned real image R1j or R2j, or that at least one of the virtual images I1j, I2j does not coincide with the assigned real image R1j or R2j. The equals sign ("=") in the formula representation in Step 20 in FIG. 2 is not to be understood as denoting equality in the strict sense. Instead, the comparison result is "yes" when real and virtual images coincide with one another, except for predetermined tolerances. Conversely, the comparison result is "no" when a difference exists between the virtual and real images that exceeds the predetermined tolerances.

If conformance exists, the current virtual volume VIj is output as the link result of the link 16 and serves as a basis for the calculation 18 of the displacement vector field VV.

Otherwise, changes are made in the current virtual volume VI. These changes, which are represented by the equation formula VIj=VIj+Δ in FIG. 2, can relate to the position, the size, the brightness or other parameters of at least one particle in the volume. The virtual volume changed in this manner is subjected to a next iteration step as the new current virtual volume VI. The iteration is continued until a sufficient conformance between real and virtual images has been achieved. This is evaluated as an indication that the current virtual volume VI coincides with sufficient accuracy with the real volume VR.

This method is carried out for each point in time t0, t1 so that the calculated virtual volumes VI0 and VI1 are available from which, with the link 18, the displacement vector field is then calculated.

Of course, the embodiments discussed in the specification and shown in the figures represent only illustrative exemplary embodiments of the present invention. In light of the present disclosure, a broad spectrum of variation possibilities is available to one skilled in the art. In particular the number and arrangement of the detectors can be varied as desired. The specific determination of the optical transfer function can also be adapted to the conditions of the individual case.

LIST OF REFERENCE NUMBERS

10 3D-PTV method
12 First detector
14 Second detector
16 Link according to the invention
18 Link for displacement vector field
20 Comparison step
22 Change step
VR Real volume
t0 First point in time
t2 Second point in time
R1$j$ Real image of VR by means of 12 at point in time tj
R2$j$ Real image of VR at point in time tj
VIj Virtual volume, representing point in time tj
VV Displacement vector field
F1 Optical transfer function of 12
F2 Optical transfer function of 14
I1$j$ Virtual image of VIj by means of F1
I2$j$ Virtual image of VIj by means of F2
Δ Change of VIj

The invention claimed is:

1. A method for determining flow conditions in a measuring volume (VR), which permeated by a fluid spiked with optically detectable particles, comprising the following steps:
   a) simultaneously recording at a first recording point in time (t0) of a first plurality of two-dimensional, real images (R10, R20) of a three-dimensional, real distribution of the particles by means of the same plurality of image detectors (12, 14) arranged spatially offset with respect to one another,
   b) repeating step a) at least at one second recording point in time (t1),
   c) determining for each recording point in time (t0, t1) a three-dimensional, estimated distribution (VI0, VI1) of the particles based on the real images and
   d) calculating a three-dimensional displacement vector field (VV) by comparing the estimated distributions (VI0, VI1), wherein e) determining for each image detector (12, 14) an optical transfer function (F1; F2) with which the real distribution (VR) is imaged by the image detector (12; 14) before carrying out step c),
   and wherein step c) starts with a roughly estimated starting distribution (VIstart) as an estimated distribution (VIj) and thereafter is carried out iteratively with the following sub-steps:
   c1) calculating two-dimensional, virtual images (I1$j$, I2$j$) of the estimated distribution on the basis of the transfer functions (F1, F2) determined in Step e,
   c2) comparatively determining differences between the virtual images (I1$j$; I2$j$) and the respectively assigned real images (R1$j$; R2$j$),
   c3) changing the estimated distribution (VIj) depending on the determined differences, and
   wherein the iteration is ended when a predetermined termination criterion has been reached.

2. The method according to claim 1, wherein the iteration is ended when the determined differences fall below predetermined tolerance values.

3. The method according to claim 1, wherein in Step c3 the estimated distribution (VIj) is changed regarding the number of particles and/or the position, the size and/or the intensity of at least one particle.

4. The method according to claim 1, wherein in step c2 in addition differences between virtual images (I1$j$; I2$j$) of different iteration steps are determined.

5. The method according to claim 1, wherein step b is carried out at more than one second recording point in time, and in step c3 each change of the estimated distribution is subjected to a plausibility check under the assumption that no non-marginal particle can disappear from the measuring volume.

6. The method according to claim 1, wherein in step e the optical transfer functions (F1, F2) are determined by recording real images of one or more known objects in the measuring volume and comparing the known object or objects with the recorded images.

7. The method according to claim 6, wherein a known object is a calibration plate or a calibration grid.

* * * * *